Patented Dec. 22, 1936

2,065,183

UNITED STATES PATENT OFFICE 2,065,183

PROCESSED CHEESE AND METHOD OF PREPARING THE SAME

Benjamin R. Harris, Chicago, Ill., assignor to Kraft-Phenix Cheese Corporation, Chicago, Ill., a corporation of Delaware No Drawing. Application October 4, 1935, Serial No. 43,603

13 Claims. (Cl. 99—162)

This application is in part a continuation of my copending application Serial No. 458,249, filed May 31, 1930.

My invention relates to an improved process for the treatment of cheese and product resulting from said process. My invention relates broadly to the manufacture of so-called "process" cheese.

Considerable development has taken place in recent years in the art of preparing cheese for the market, particularly hard cheeses of the so-called "Cheddar" type, which are at their best at a certain stage of ripening and are preferably offered to the public for use when in their best condition. Processes have been developed for the treatment of such cheeses, whereby the cheese is taken at its best stage of ripening and further ripening arrested by pasteurizing processes, including heating to render the cheese plastic, after which the treated cheese is packaged while plastic and warmed in such a way as to reduce further bacterial and enzymic action. Unless precautions are taken during the heating, the cheese is apt to suffer from demulsification so as to be no longer a homogeneous emulsion. Means have been developed for reducing this demulsification, and these means include the addition of chemical compounds in the nature of homogenizing agents or substances for preventing the demulsification of the cheese.

I have discovered that the homogenizing substances heretofore used in cheese making are susceptible of considerable modification and improvement. I have found that improved results may be obtained if ripened cheese is treated with an anti-acid salt of organic acids having more than two hydroxyl groups in the molecule, preferably four or five hydroxyl groups in the molecule. The use of such agents produces improved results which will be more fully described hereinafter.

By "anti-acid salts" I have reference to salts which are anti-acid with respect to the natural acidity of the cheese which is to be treated in accordance with my invention, whereby said salts have a buffering effect upon said acid so as to reduce or otherwise beneficially modify said natural acidity. Salts coming within the scope of my invention may be neutral, approximately neutral, acid, or alkaline, as measured on a potentiometric scale, the prime consideration being that the salt falling within the category described herein will buffer or otherwise beneficially modify the acidity of the cheese, i. e., is anti-acid to the cheese. An approximately neutral sodium salt of mucic acid is an example of one of my homogenizing agents.

A specific method by means of which I may carry out my process is to take a Cheddar cheese alone, or blended with other types if desired, or any cheese made by a cheddaring process, grind the cheese and place it in a heating receptacle. Heat is then applied by passing steam through the mass while agitating it. The heat may be applied to the outside of the container, with suitable precautions to prevent overheating. Heating is continued with agitation until the proper consistency is imparted to the cheese, or until the product obtains some mobility and loses its rigidity, and, at the same time, the content of bacteria, yeasts, and molds is diminished substantially, the extent depending on the time and temperature of heating. Excessive heating is to be avoided, as tending to demulsify the cheese.

In order to prevent the separation of the constituents of the cheese it is advisable to add a small proportion of water, varying from 2 per cent to 5 per cent, and to modify the acidity by dissolving in or mixing with this water a suitable quantity of an innocuous anti-acid substance in proportions varying from 1 per cent to 3 per cent on a basis of the finished product. The material may be stirred and heated from fifteen to thirty minutes at a temperature of 150 to 160° F., or somewhat above if desired, until the proper plasticity is obtained. It is then introduced into a package of suitable design, such as a jar, a wood or cardboard container lined with flexible sheet material, etc.

I use an improved homogenizing substance, preferably anti-acid to the cheese, having more than two hydroxy groups in the molecule, preferably salts of organic acids, such as the salts of gluconic, mucic, saccharic, gulonic, xylonic, galactonic, or other such acids. Among the salts of such acids with which I have obtained good results are sodium mucate, sodium gluconate, calcium gluconate, or combinations thereof. In general, any innocuous cation which gives sufficiently soluble salts with the acids concerned, may be employed, such as ammonium, sodium, potassium, calcium, magnesium, aluminum, and the like and mixtures thereof.

Reference to said salts is not to be taken as limiting my invention to salts having any specific basicity. As said salts are frequently prepared by titration of the corresponding acid, I may adjust said titration to any predetermined point of basicity which will give the desired buffering action to the acidity of the cheese, the latter having previously been determined by appropriate tests.

The advantage of such anti-acid substances over homogenizing substances used heretofore is derived from the portion of the molecule which resembles sugar in chemical structure. Sugars are known to benefit the dispersion of casein by their presence in cheese, but unfortunately they suffer from the disadvantage that, first, they generally contribute a sweet taste which may be out of place in cheese, and, secondly, they are subject to fermentation and gas formation, which in general is objectionable in cheese. My anti-acid substances do not contribute the sweet taste and are practically immune from fermentation with gas formation.

Numerous modifications and variations coming within the spirit of my invention will probably suggest themselves to those skilled in the art. Hence, I do not wish to be limited except to the extent indicated by the appended claims, which should be interpreted as broadly as the state of the art will permit.

I claim as my invention:

1. A body of ripened and processed cheese having as an added constituent thereof a minor proportion of a soluble salt of an aliphatic acid, having more than two hydroxyl groups in the molecule which resembles sugar in chemical structure, said salt being anti-acid to the acidity of the cheese prior to processing and being a salt of an innocuous base.

2. A method of processing cheese comprising adding thereto a minor proportion of a soluble salt of an aliphatic acid having more than two hydroxyl groups in the molecule which resembles sugar in chemical structure, said salt being anti-acid to the acidity of the cheese prior to processing and being a salt of an innocuous base, and heating the material to a temperature high enough and of sufficient length of time to reduce the microbial content of the cheese.

3. A product comprising processed cheese and a soluble anti-acid gluconate.

4. The method of processing cheese comprising adding to the cheese a small proportion of a soluble anti-acid salt of gluconic acid, heating the mass to a temperature high enough and for a sufficient length of time to reduce the microbial content of the cheese.

5. The method of processing cheese comprising mixing two or more kinds of cheese together, adding to the mixture a small proportion of a soluble anti-acid salt of gluconic acid, heating the mass to a temperature high enough and for a sufficient length of time to reduce the microbial content of the cheese.

6. A product comprising processed cheese and calcium gluconate.

7. The method of processing cheese comprising adding to the cheese a small proportion of calcium gluconate, and heating the mass with stirring to a temperature high enough to reduce the microbial content of the cheese.

8. The improvement in the art of treating cheese which comprises adding during the process a quantity of about 2 per cent of an approximately neutral sodium salt of mucic acid.

9. The improvement in the art of treating cheese which comprises adding during the process a quantity of about 2 per cent of an anti-acid sodium salt of mucic acid said salt being anti-acid to the acidity of said cheese.

10. The improvement in the art of treating cheese which consists in adding during the process a quantity from 1 per cent to 3 per cent of an approximately neutral salt of an organic polybasic acid containing more than two hydroxyl radicals in the molecule which resembles sugar in chemical structure.

11. The improvement in the art of treating cheese which comprises adding during the process a quantity from 1 per cent to 3 per cent of an approximately neutral sodium salt of mucic acid.

12. The improvement in the art of treating cheese which consists in adding during the process a quantity from 1 per cent to 3 per cent of an approximately neutral salt of a monobasic organic acid containing more than two hydroxy radicals in the molecule which resembles sugar in chemical structure.

13. The process of treating cheese which consists in adding during the process a small percentage of an innocuous anti-acid edible salt of saccharic acid, said percentage not substantially exceeding 3 per cent and not being substantially less than 1 per cent.

BENJAMIN R. HARRIS.